United States Patent [19]

Hahn et al.

[11] Patent Number: 4,690,616

[45] Date of Patent: Sep. 1, 1987

[54] ROTOR STRUCTURE, ESPECIALLY FOR ROTARY WING AIRCRAFT

[75] Inventors: Michael Hahn, Ottobrunn; Gerald Kuntze-Fechner, Bad Wiessee, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 884,961

[22] Filed: Jul. 14, 1986

[30] Foreign Application Priority Data

Jul. 24, 1985 [DE] Fed. Rep. of Germany ....... 3526470

[51] Int. Cl.$^4$ .............................................. B64C 27/35
[52] U.S. Cl. ................. 416/134 A; 416/140; 416/141
[58] Field of Search .......... 416/134 A, 138 A, 140 A, 416/141

[56] References Cited

U.S. PATENT DOCUMENTS

| 4,012,169 | 3/1977 | Mouille et al. | 416/141 X |
| 4,053,258 | 10/1977 | Mouille | 416/141 X |
| 4,222,709 | 9/1980 | Mouille | 416/134 A |
| 4,244,677 | 1/1981 | Noehren et al. | 416/140 A X |
| 4,252,503 | 2/1981 | Wackerle et al. | 416/141 |
| 4,273,511 | 6/1981 | Mouille et al. | 416/141 X |
| 4,293,277 | 10/1981 | Aubry | 416/134 A |
| 4,334,825 | 6/1982 | Braun et al. | 416/134 A |
| 4,547,127 | 10/1985 | Frommlet et al. | 416/134 A |

FOREIGN PATENT DOCUMENTS

| EP85128 | 8/1983 | European Pat. Off. | 416/134 A |
| EP85129 | 8/1983 | European Pat. Off. | 416/138 A |
| 2829605 | 2/1983 | Fed. Rep. of Germany . | |
| 3412592 | 10/1985 | Fed. Rep. of Germany | 416/134 A |

*Primary Examiner*—Everette A. Powell, Jr.
*Attorney, Agent, or Firm*—W. G. Fasse; D. H. Kane, Jr.

[57] ABSTRACT

A rotor for a rotary wing aircraft has two damping structures on the outside of the blade angle adjustment sleeve. Each damping structure is a sandwich of an elastomeric layer between two stiff cover layers. A two-armed strut passes through the blade neck and is connected at its center in a pivoting manner to the blade root. The threaded outer ends of the two-armed struts pass through the respective sandwich for yieldingly connecting the radially inner end of the blade angle adjustment sleeve to the blade root. By tightening nuts on the threaded strut arms the elastomeric layer may be compressed. Thus, the damping structure performs, in addition to the damping function, a connecting function for the blade angle adjustment sleeve.

5 Claims, 2 Drawing Figures

U.S. Patent    Sep. 1, 1987    4,690,616

ROTOR STRUCTURE, ESPECIALLY FOR ROTARY WING AIRCRAFT

FIELD OF THE INVENTION

The invention relates to a rotor structure, especially for rotary wing aircraft, having one or more rotor blades each comprising a blade root, a blade neck and a blade wing section.

DESCRIPTION OF THE PRIOR ART

In rotor structures of this type the blade neck is torsionally flexible for allowing blade pitch angle adjustments. The neck is arranged between the blade root and the blade wing section. Each rotor blade is attached to the rotor hub by means of a bolt passing through the blade root. Furthermore, a torsionally stiff blade control sleeve extends without contact along the blade neck and serves to control the blade pitch angle adjustment. The blade control sleeve is rigidly connected at its radially outer end to the blade wing section and is supported at its radially inner end so as to allow longitudinal and angular movements relative to the blade root. This longitudinally and angularly movable support is achieved by at least one two-armed support strut, which is arranged in a laterally slidable and articulated manner in a hole or cut-out in the blade root.

Such a rotor is known from German Patent Publication (DE-OS) No. 3,241,754 which is an improvement over the rotor according to German Patent Publication (DE-OS) No. 2,829,605. This improved rotor structure comprises large surface elastomeric bearing sections to support the blade control sleeve against the upper and lower surfaces of the blade root. The improvement is seen in an increased life-span of the corresponding bearing sections, which insure the movability of the blade control sleeve. In order to achieve an effective damping of blade lead-lag movements the latter rotor comprises damping plates set in between the elastomeric bearing sections and the blade root. However, the danger of heat stagnation and subsequent thermal damage of the damping plates exists in such an encapsulated arrangement. Furthermore, it is not easily possible to pre-compress the damping plates in a controlled manner for protecting these damping plates against tensile loading.

OBJECTS OF THE INVENTION

In view of the foregoing, it is the aim of the invention to achieve the following objects singly or in combination:

to provide a rotor structure for rotary wing aircraft with an arrangement for an effective damping of blade lead-lag movements by utilizing an elastomeric support having a long life-span;

to avoid heat stagnation in such a vibration damping arrangement and thereby prevent thermal damage to the elastomer;

to allow precise pre-compressing of the shock absorbing or damping plates to prevent tension damages in such a vibration damping, especially lead-lag motion damping arrangement; and to achieve a light, simple and inexpensive construction of such a rotor which shall require low maintenance.

SUMMARY OF THE INVENTION

The above objects are achieved in a rotor structure according to the invention, comprising a damping arrangement above and below the blade root outside of the blade control sleeve. Each of these damping arrangements comprises at least one damping elastomeric layer arranged between two stiff cover layers lying parallel to the lead-lag plane of the rotor. Each of these damping arrangements is a connecting member between the blade control sleeve and a respective strut arm of a two-armed support strut. This two-armed support strut is a threaded bolt which passes through and protrudes from the damping arrangement so that a corresponding nut can be screwed down to achieve a compression of the elastomeric layer.

Hereby, the gist of the invention is not limited to the placing of the blade vibration or rather lead-lag damping means in a location which is naturally subject to cooling airstreams and is thereby protected against undesirable heating by means of positive air cooling. Rather, the strut arms are substantially protected against damage because, according to the invention, the strut arms are simultaneously used as a support means for the blade control sleeve and as a compression means for the damping arrangement. Furthermore, the dual functionality of the strut arms as support means and as compression means allows a light, simple, and inexpensive structure which requires low maintenance.

BRIEF DESCRIPTION OF THE DRAWINGS

In order that the invention may be clearly understood, it will now be described by way of example, with reference to the accompanying drawings, wherein.

Figures 1, 2:
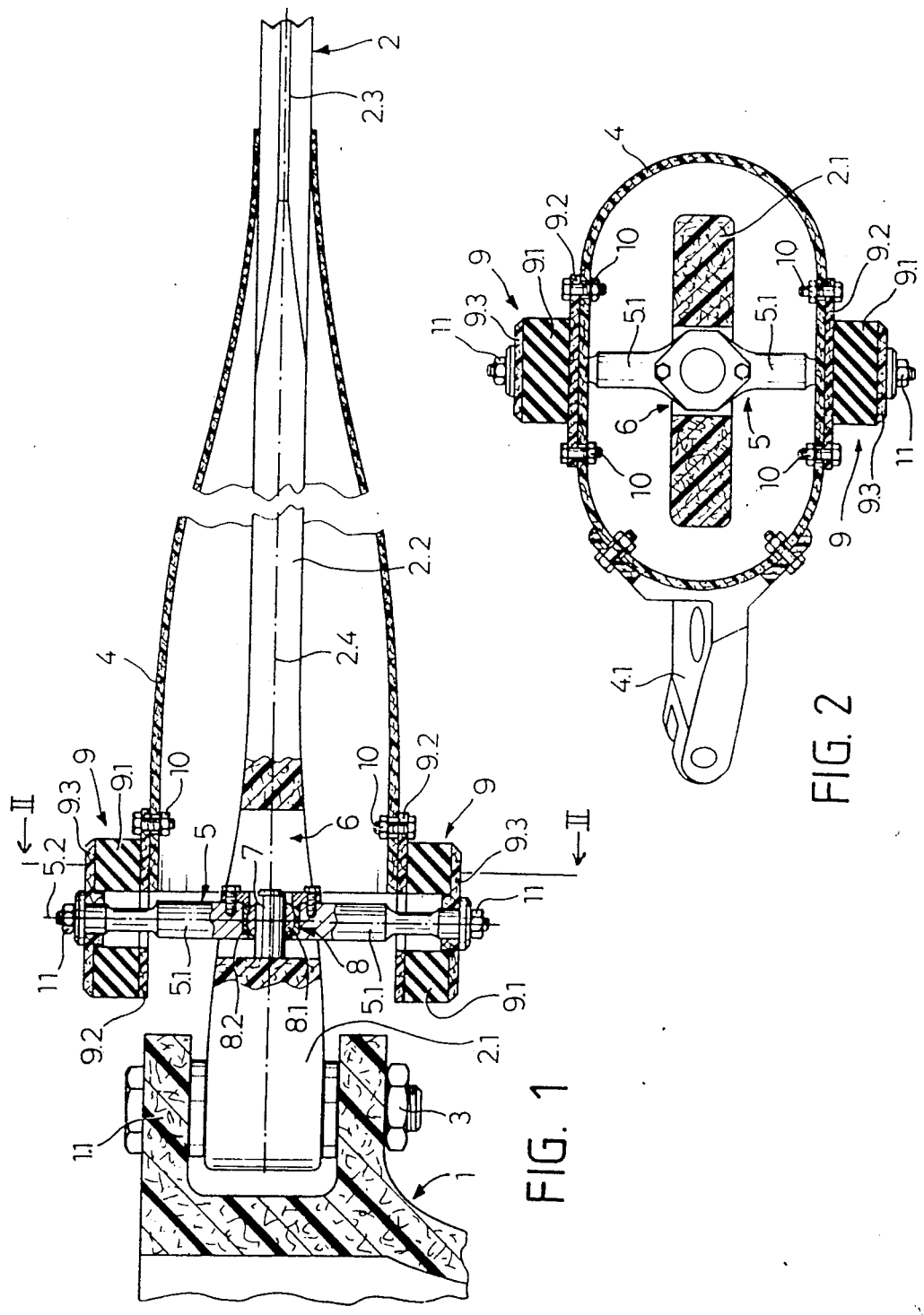
FIG. 1 is a vertical lengthwise section through a rotor structure of a rotary wing aircraft according to the invention.
FIG. 2 is a cross-section along section line II—II in FIG. 1 through the blade neck and control means of the rotor blade.

DETAILED DESCRIPTION OF PREFERRED EXAMPLE EMBODIMENTS AND OF THE BEST MODE OF THE INVENTION

As shown in FIG. 1, a rotor hub 1, which may for example be made of fiber reinforced synthetic materials, is provided with one or more radially outwardly pointing rotor hub yokes 1.1 for connecting to a respective rotor blade or blades 2. Each separate rotor hub yoke 1.1 is connected to the corresponding blade root 2.1 by means of a nut and bolt 3 passing through the thickness of the blade root 2.1. Such a structure forms a so-called rigid blade connection. In order to allow the rotor blade 2, or rather its wing section 2.3, to undergo blade pitch or blade angle adjustment movements about the blade pitch axis 2.4, a torsionally yielding blade neck 2.2 is provided between the blade root 2.1 and the blade wing section 2.3. The desired torsional flexibility is achieved in that the blade neck 2.2 is made of a fiber material having unidirectional fibers lying in the blade's lengthwise direction.

Due to the relatively long structural length of the blade neck 2.2, a torsionally stiff blade control sleeve 4 is provided for achieving the blade pitch adjustment control. The blade control sleeve 4 is torsionally rigidly connected to the blade wing section 2.3, for example, by an adhesive bonding resulting from the curing of the fiber composite material. The sleeve 4 extends without contact along the blade neck 2.2 to the blade root 2.1. Pitch adjustment movements may be achieved by the blade control sleeve 4 in a known manner, by means of a control rod attached to a control lever 4.1 which is rigidly attached to the control sleeve 4, as shown in FIG. 2.

A simple rotationally movable connection of this blade control sleeve 4 with the blade root 2.1 would be inadequate, because a lengthwise movement between the blade control sleeve 4 and the blade root 2.1 also occurs due to the effects of bending of the blade neck 2.2 and blade elongation due to blade flapping and blade lead-lag movements. Therefore, an articulated connection between the blade control sleeve 4 and the blade root 2.1 is constructed to allow not only rotational flapping and angular lead-lag movements, but also lengthwise movements of the blade control sleeve 4 relative to the blade root 2.1. In order to achieve those movements of the blade control sleeve 4, a two-armed strut 5 supports the blade control sleeve 4. A pin 7 is arranged coaxially with the blade pitch axis 2.4 in a cut-out or hole 6 of the blade root 2.1. A ball and socket joint 8 connects the pin 7 and the support strut 5. The ball 8.1 of the ball and socket joint 8 is longitudinally slidable on the pin 7, whereas the socket ring 8.2 of the ball and socket joint 8 is held in a fixed position in a bore or hole centered in the strut 5. Similarly, it is possible to arrange such a pin 7 on the strut 5 and attach the socket ring 8.2 to the blade root 2.1, for example, by means of a pipe extension.

Furthermore, due to the long structure of the blade neck 2.2 among other things, unstable swinging oscillations of the rotor blade 2, particularly lead-lag movements, must be damped, especially during rotor start-up and run-down, for example. Therefore, a damping structure 9 is arranged on each of the two sides of the blade root 2.1 outside of the blade control sleeve 4. The above mentioned positive air-cooling of the damping structure 9, during rotor operation, is one advantage of locating the structure 9 outside the sleeve 4.

Each damping arrangement 9 comprises at least one elastomeric layer 9.1 having a high damping coefficient, for example made of polyurethane. The elastomeric layer 9.1 is arranged between two stiff cover plates or layers 9.2, 9.3, for example made of carbon fiber-reinforced synthetic materials which are stiff due to the high stiffness in the fiber extension direction in the plane of the fiber layer. Depending on the specific embodiment, several elastomeric layer 9.1 and cover plates 9.2, 9.3 are arranged in parallel to the rotor lead-lag plane, whereby the two damping arrangements 9 of each blade are arranged symmetrically relative to the blade pitch axis 2.4. Each of the two damping arrangements 9 is a connection member between a respective strut arm 5.1 and the blade control sleeve 4, whereby the strut arm 5.1 passes through the center of the corresponding damping arrangement 9 with such a freedom of movement relative to the inner cover layer 9.2 and the elastomeric layer 9.1, that over the range of the elastomer's deformability or rather at the maximum extent of the damping effect, the inner cover layer 9.2 is slidable relative to the outer cover layer 9.3 by the blade wing section 2.3. For this purpose the inner cover layer 9.2 must simply be connected to the blade control sleeve 4 by means of a screw or bolt connection 10, or the like.

The specified location of the damping structure 9 outside of the blade control sleeve 4, whereby the damping structure 9 also serves as a connection means between the blade control sleeve 4 and a strut arm 5.1, has the great advantage that the strut arm may simultaneously be used as a compression or clamping means for the damping structure 9. For this purpose each strut arm 5.1 projects as a threaded bolt beyond the corresponding damping structure 9, or rather from the outer cover layer 9.3, so far that a nut 11 may be screwed onto this projecting end. By screwing down the nuts 11 a clamping effect of the cover layers 9.2, 9.3 on the elastomeric layer 9.1 is achieved and a corresponding compression of the elastomeric layer 9.1 occurs. By means of an appropriately controlled adjustment of the force exerted by the nuts 11, a precise pre-compression of the separate elastomeric layers 9.1 may be achieved. This pre-compression compensates for the effects of tensile forces working on the cover layers 9.2, 9.3 during the operation of the rotor, whereby damage to the elastomeric layer 9.1 due to tensile force loading is largely prevented.

In the above described structure of the struts 5 in which the lengthwise strut axis 5.2 of both strut arms 5.1 intersects the blade pitch axis 2.4 in the centerpoint of the ball and socket joint 8, an optimal symmetric articulated joint is achieved. Additionally, the largest possible stiffness in the strut arms 5.1 in the direction of the screw force applied by the nuts 11 is achieved.

Although the invention has been described with reference to specific example embodiments, it will be appreciated, that it is intended to cover all modifications and equivalents within the scope of the appended claims.

What we claim is:

1. A rotor structure, especially for rotary wing aircraft, comprising a rotor hub and one or more rotor blades, each blade having a blade root, a blade neck, a blade wing section, and a blade pitch angle control sleeve, said blade neck being torsionally yielding for allowing a blade pitch angle adjustment movement, said blade neck being arranged between said blade root and said blade wing section, means connecting each rotor blade root to said rotor hub, said control sleeve being torsionally stiff for transmitting blade pitch angle adjustment forces to said wing section, said control sleeve extending essentially coaxially along but without contacting said blade neck to one end where said control sleeve is rigidly connected to said blade wing section, two-armed support strut means for securing an opposite end of said control sleeve to said blade root in a longitudinally slidable and rotatable manner relative to said blade root, said support strut means comprising bearing means for connecting said support strut means to said blade root in an articulated and slidable manner, said bearing means of said strut means being located in a hole in said blade root, said rotor structure further comprising damping means arranged above and below of said blade root outside said blade control sleeve, said damping means comprising at least an outer and an inner stiff cover layer and at least one damping elastomeric layer arranged between said inner and outer cover layers, said layers being arranged parallel to a lead-lag plane of said rotor blades, said damping means simultaneously forming a connection between said blade control sleeve and a respective strut arm of said two-armed support strut means, said strut arms, formed as threaded bolts, projecting from said damping means, and a nut for each threaded bolt strut for compressing the respective elastomeric layer.

2. The rotor structure of claim 1, wherein said damping means comprise a central opening through which said respective strut arm passes through the center of said damping means, said central opening being sufficiently large in said damping layer and in said inner cover layer for freedom of movement between said damping means and said strut means, serving to transmit compression forces.

3. The rotor structure of claim 1, wherein said inner stiff cover layer of said damping means is rigidly attached to said blade control sleeve.

4. The rotor structure of claim 1, wherein said bearing means for connecting said support strut means to said blade root comprise a ball and socket joint and a bearing stud for said ball and socket joint, said bearing stud extending coaxially with a radial, longitudinal blade pitch angle axis, and wherein said support strut means have a longitudinal axis intersecting said pitch angle axis of said rotor blade in the center of said ball and socket joint.

5. The rotor structure of claim 4, wherein said ball and socket joint is secured to said two-armed strut means and wherein said bearing stud, on which said ball is mounted, is secured to said blade root.

* * * * *